United States Patent
Subramaniyam

(10) Patent No.: US 10,617,994 B2
(45) Date of Patent: Apr. 14, 2020

(54) AMINE BASED HYDROGEN SULFIDE SCAVENGING ADDITIVE COMPOSITIONS OF COPPER SALTS, AND MEDIUM COMPRISING THE SAME

(71) Applicant: Dorf Ketal Chemicals (India) Private Limited, Mumbai (IN)

(72) Inventor: Mahesh Subramaniyam, Mumbai (IN)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 0 days.

(21) Appl. No.: 16/339,272

(22) PCT Filed: Dec. 19, 2017

(86) PCT No.: PCT/IB2017/058145
§ 371 (c)(1),
(2) Date: Apr. 3, 2019

(87) PCT Pub. No.: WO2018/122680
PCT Pub. Date: Jul. 5, 2018

(65) Prior Publication Data
US 2019/0344213 A1   Nov. 14, 2019

(30) Foreign Application Priority Data
Dec. 31, 2016  (IN) .............................. 201621045193

(51) Int. Cl.
*B01D 53/14* (2006.01)
*C10G 29/06* (2006.01)
*C10G 29/20* (2006.01)

(52) U.S. Cl.
CPC ..... *B01D 53/1493* (2013.01); *B01D 53/1468* (2013.01); *C10G 29/06* (2013.01); *C10G 29/20* (2013.01); *B01D 2252/20431* (2013.01); *B01D 2252/20489* (2013.01); *B01D 2252/602* (2013.01); *C10G 2300/207* (2013.01)

(58) Field of Classification Search
CPC ......... B01D 53/14; C10G 29/06; C10G 29/20
See application file for complete search history.

(56) References Cited

U.S. PATENT DOCUMENTS

| | | | |
|---|---|---|---|
| 2,482,354 A | 9/1949 | Max et al. | |
| 3,928,211 A * | 12/1975 | Browning | C09K 8/032 507/145 |
| 5,128,049 A | 7/1992 | Gatlin | |
| 8,663,457 B2 * | 3/2014 | Kaplan | C10G 29/20 208/207 |
| 2005/0153846 A1 * | 7/2005 | Gatlin | B01D 15/00 507/239 |
| 2013/0320258 A1 * | 12/2013 | Lehrer | B01D 53/1493 252/189 |
| 2014/0190870 A1 * | 7/2014 | Lehrer | C10G 29/06 208/240 |
| 2015/0218342 A1 * | 8/2015 | Martin | C08K 5/175 106/157.1 |
| 2017/0008802 A1 * | 1/2017 | Martin | C08L 95/00 |
| 2017/0015811 A1 * | 1/2017 | Martin | C08K 5/175 |
| 2017/0022109 A1 * | 1/2017 | Poland | C08K 5/521 |
| 2017/0260095 A1 * | 9/2017 | Song | C08K 5/0091 |

FOREIGN PATENT DOCUMENTS

| | | |
|---|---|---|
| CN | 106110881 A | 11/2016 |
| IN | 201621045193 | 12/2016 |
| WO | 2014170047 A1 | 10/2014 |
| WO | 2015116864 A1 | 8/2015 |
| WO | 2018122680 A1 | 7/2018 |

OTHER PUBLICATIONS

Foreign communication from the priority International Application No. PCT/IB2017/058145 International Search Report and Written Opinion, dated Mar. 7, 2018, 10 pages.
Foreign communication from the priority International Application No. PCT/IB2017/058145, International Preliminary Report on Patentability of the International Preliminary Examining Authority, dated Oct. 16, 2018, 17 pages.

* cited by examiner

*Primary Examiner* — Ellen M McAvoy
(74) *Attorney, Agent, or Firm* — Conley Rose, P.C.; Rodney B. Carroll

(57) ABSTRACT

The present invention relates to amine based hydrogen sulfide ($H_2S$) scavenging additive compositions comprising A) an additive 1 comprising at least one compound selected from the group comprising copper compound, copper soap, and copper salts of organic acid; and B) at least one activator capable of enhancing hydrogen sulfide ($H_2S$) scavenging efficiency of the additive 1, wherein the activator comprises aliphatic tertiary amine, or oxyalkylated derivate of aliphatic amine, or a mixture thereof. The present invention also relates to a process for scavenging hydrogen sulfide in hydrocarbons by employing the amine based hydrogen sulfide ($H_2S$) scavenging additive composition of the present invention. The present invention also relates to a method of using the amine based hydrogen sulfide ($H_2S$) scavenging additive composition of the present invention for scavenging hydrogen sulfide in hydrocarbons.

17 Claims, No Drawings

AMINE BASED HYDROGEN SULFIDE SCAVENGING ADDITIVE COMPOSITIONS OF COPPER SALTS, AND MEDIUM COMPRISING THE SAME

CROSS REFERENCE TO RELATED APPLICATIONS

This application is a filing under 35 U.S.C. 371 of International Application No. PCT/IB2017/058145 filed Dec. 19, 2017, entitled "Amine Based Hydrogen Sulfide Scavenging Additive Compositions of Copper Salts, and Medium Comprising the Same," which claims priority to Indian Patent Application No. 201621045193 filed Dec. 31, 2016, which applications are incorporated by reference herein in their entirety.

FIELD OF THE INVENTION

The present invention relates to amine based hydrogen sulfide ($H_2S$) scavenging additive compositions comprising:
A) an additive 1 comprising at least one compound selected from the group comprising copper compound, copper soap, and copper salts of organic acid; and
B) at least one activator capable of enhancing hydrogen sulfide ($H_2S$) scavenging efficiency of the additive 1, wherein the activator comprises aliphatic tertiary amine, or oxyalkylated derivate of aliphatic amine, or a mixture thereof.

The present invention also relates to a process for scavenging hydrogen sulfide in hydrocarbons by employing the amine based hydrogen sulfide ($H_2S$) scavenging additive composition of the present invention.

The present invention also relates to a method of using the amine based hydrogen sulfide ($H_2S$) scavenging additive composition of the present invention for scavenging hydrogen sulfide in hydrocarbons.

BACKGROUND OF THE INVENTION

The prior art additive consisting of a compound selected from the group consisting of copper compound, copper soap, and copper salts of organic acid is known to scavenge hydrogen sulphide ($H_2S$) in asphalt/bitumen/crude oil/hydrocarbons.

However, the industry aims to use the composition which would comprise reduced amount of the compound selected from the group consisting of copper compound, copper soap, and copper salts of organic acid to make the process more economical and environment friendly.

Therefore, there is a need to have an improved composition for scavenging hydrogen sulphide in hydrocarbons which would comprise reduced amount of the compound selected from the group consisting of copper compound, copper soap, and copper salts of organic acid.

Accordingly, the present invention aims at providing an improved composition for scavenging hydrogen sulphide in hydrocarbons which would comprise reduced amount of the compound selected from the group comprising copper compound, copper soap, and copper salts of organic acid, and also to use thereof.

OBJECTS OF THE INVENTION

Therefore, a main object of the present invention is to provide an improved additive composition which, at least, comprises:
substantially reduced amount of additive 1 comprising at least one compound selected from the group comprising copper compound, copper soap, and copper salts of organic acid,
the amount of the composition of the present invention is also required in substantially reduced amount, and thereby, makes the composition and its use economical, industrially feasible and convenient, and
wherein the composition of the present invention is also suitable for scavenging sulfur containing compounds including, but not limited to, hydrogen sulfide and mercaptans, particularly hydrogen sulfide in the hydrocarbons or hydrocarbon streams, and
may overcome the above-described problems of the prior art.

Accordingly, another main object of the present invention is to provide an improved composition, which is amine based hydrogen sulfide ($H_2S$) scavenging additive composition for scavenging the hydrogen sulphide in hydrocarbons comprising reduced amount of a compound selected from the group comprising copper compound, copper soap, and copper salts of organic acid.

Accordingly, still another object of the present invention is to provide a process for scavenging hydrogen sulfide in hydrocarbons by employing the amine based hydrogen sulfide ($H_2S$) scavenging additive composition of the present invention.

Accordingly, yet another object of the present invention is to provide a method of using the amine based hydrogen sulfide ($H_2S$) scavenging additive composition of the present invention for scavenging hydrogen sulfide in hydrocarbons.

In particular, there is provided a composition for scavenging the hydrogen sulphide in hydrocarbons comprising an additive 1 and at least one activator (amine or oxyalkylated derivative of amine or a mixture thereof) of the presently provided composition of the present invention, which is capable of increasing hydrogen sulfide scavenging efficiency of the prior art composition consisting only of the additive 1 of the present invention (the additive 1 comprising at least one compound selected from the group consisting of copper compound, copper soap, and copper salts of organic acid).

Other objects and advantages of present invention will become more apparent from the following description when read in conjunction with examples, which are not intended to limit scope of present invention.

DETAILED DESCRIPTION

With aim to provide an improved additive composition which may solve the above-discussed problems of the prior art, i.e. of using substantially higher amount of the prior art additive consisting of at least one compound selected from the group comprising copper compound, copper soap, and copper salts of organic acid (herein after may be referred to as 'additive 1'), the Inventor has found that if at least one activator comprising aliphatic tertiary amine, or oxyalkylated derivate of aliphatic amine, or a mixture thereof is added to the additive 1, then surprisingly and unexpectedly, the $H_2S$ scavenging efficiency of the additive 1 is substantially improved.

Therefore, in first embodiment, the present invention relates to an amine based hydrogen sulfide ($H_2S$) scavenging additive compositions comprising:
A) an additive 1 comprising at least one compound selected from the group comprising copper compound, copper soap, and copper salts of organic acid; and B) at least one activator capable of enhancing hydrogen sulfide ($H_2S$) scavenging efficiency of the additive 1, wherein the activator comprises aliphatic tertiary amine, or oxyalkylated derivate of aliphatic amine, or a mixture thereof.

In accordance with one of the preferred embodiments, the copper salt of the organic acid is selected from the group comprising:
(i) copper octoate;
(ii) copper glycinate; or
(iii) a mixture thereof.

In accordance with one of the preferred embodiments, the aliphatic tertiary amine activator is selected from the group comprising:
(a) tri-isopropanolamine (TIPA);
(b) ethylene oxide (EO) derivative of TIPA or ethoxylated TIPA (EO-TIPA);
(c) propylene oxide (PO) derivative of TIPA or propoxylated TIPA (PO-TIPA); and
(d) a mixture thereof.

In accordance with one of the further embodiments of the present invention, the aliphatic tertiary amine activator may comprise:
N,N,N',N'-Tetrakis (2-hydroxyethyl) ethylene-diamine (THEED);
N,N,N',N' tetrakis (2-hydroxypropyl) ethylene-diamine (Quadrol®); or
A mixture thereof.

In accordance with one of the preferred embodiments, the oxyalkylated derivate of aliphatic tertiary amine comprises:
ethylene oxide (EO) derivative of aliphatic tertiary amine;
propylene oxide (PO) derivative of aliphatic tertiary amine; or
a mixture thereof.

In accordance with one of the preferred embodiments, the aliphatic tertiary amine comprises at least one hydroxyl group in the alkyl chain.

In accordance with one of the another preferred embodiments, the aliphatic tertiary amine comprises at least three or more hydroxyl group in the alkyl chain.

In accordance with one of the preferred embodiments, the presently provided composition may further comprise polyphosphoric acid (PPA), herein after may be referred to as additive 2 of the present invention.

In accordance with one of the preferred embodiments of the present invention, the ethoxylated TIPA (EO-TIPA) may be obtained by reacting 1 mole of TIPA with at least 1 mole of ethylene oxide (EO). For example, the ethoxylated TIPA may be obtained by reacting 1 mole of TIPA with 1 to 50 moles of ethylene oxide (EO).

In accordance with one of the preferred embodiments of the present invention, the propoxylated TIPA (PO-TIPA) may be obtained by reacting 1 mole of TIPA with at least 1 mole of propylene oxide (PO). For example, the propoxylated TIPA may be obtained by reacting 1 mole of TIPA with 1 to 50 moles of propylene oxide (PO).

In accordance with one of the preferred embodiments of the present invention, the hydrocarbon may comprise hydrocarbon stream including crude oil, fuel oil, sour gas, asphalts and refined products contained in storage tanks, vessels, and pipelines.

In accordance with one of the preferred embodiments of the present invention, the hydrogen sulfide containing compounds may comprise sulfur containing compounds, including hydrogen sulphide or mercaptans, or a mixture thereof.

In one embodiment, the present invention also relates to a composition for scavenging hydrogen sulfide, wherein the composition comprises:
(a) a hydrocarbon comprising sulfur containing compounds; and
(b) a hydrogen sulfide scavenging additive composition of the present invention.

In another embodiment, the present invention also relates to a method for scavenging hydrogen sulphide in hydrocarbon comprising sulfur containing compounds, wherein the method comprises contacting the hydrocarbon with the amine based hydrogen sulfide scavenging additive composition of the present invention.

In still another embodiment, the present invention also relates to a method of using the amine based hydrogen sulfide scavenging additive composition for scavenging hydrogen sulphide in hydrocarbon comprising sulfur containing compounds, wherein the method comprises adding to the hydrocarbon the amine based hydrogen sulfide scavenging additive composition of the present invention.

Accordingly, in accordance with one of the preferred embodiments of the present invention, in carrying out the method of scavenging or method of use of the present additive composition for scavenging sulfur containing compounds including the hydrogen sulfide and/or mercaptans in hydrocarbon or hydrocarbon stream, the scavenging additive composition is added to the hydrocarbon or gas stream or hydrocarbon stream in a concentration sufficient to substantially scavenge hydrogen sulfide and/or mercaptans therein.

In accordance with one of the preferred embodiments of the present invention, the scavenging additive composition may be added in an amount varying from about 0.01 ppm to about 10000 ppm, preferably from about 1 to about 5000 ppm, more preferably from about 1 to about 3000 ppm, even more preferably from about 5 to about 2000 ppm by weight of the hydrocarbon or the hydrocarbon stream in method of use of the present additive composition and in a method for scavenging sulfur containing compounds including the hydrogen sulfide and/or mercaptans in the hydrocarbons or the hydrocarbon streams by employing the present additive composition. It may be noted that the amount of additive composition of the present invention to be added to the hydrocarbon would depend on medium to which it is to be added and the concentration of hydrogen sulfide or sulfur compound present therein.

In accordance with one of the preferred embodiments of the present invention, the mixture of components of the present invention may be obtained by mixing the additive 1, and the activator, and optionally the additive 2 of the presently provided compositions of the present invention in any weight (or mole) ratio.

In accordance with one of the preferred embodiments of the present invention, the hydrogen sulfide scavenging may be carried at a suitable temperature. It may be noted that the additive compositions of the present invention are applicable at a wide range of temperature as suitable for the processing units for the medium for scavenging the $H_2S$ or the sulfur compound. Therefore, the present invention is not limited by a temperature range at which it may be employed in the medium.

It may be noted that the additive compositions of the present invention may be used with a solvent, or diluent, or a mixture of solvents, or a mixture of diluents suitable for use with the medium and the hydrogen sulphide scavenging composition of the present invention. Therefore, the present invention is not limited by a solvent, or a diluent, or a mixture of solvents, or a mixture of diluents which may be employed along with the additive compositions of the present invention.

It may be noted that the present additive compositions may be used in wide range of media, for example the present additive compositions may be used in the medium containing $H_2S$ or a sulfur compound, or the medium which will form a sulfur compound or hydrogen sulphide when in use. As an exemplary embodiment of the present invention, the "medium" may be selected from the group comprising (or comprises one or more), but not limited to, hydrocarbons, crude oil, gasoline, diesel oil, fuel oil, bitumen, asphalt including asphalt refinery residue, and/or kerosene oil, etc., which either contains the $H_2S$ or a sulfur compound, or will form $H_2S$ or a sulfur compound when in use.

into the sample after about 20 min of heating. Autoclave reactor is sealed properly and maintained at temperature of about 177° C. for about 1 hr. To check the $H_2S$ concentration, the temperature of the autoclave is brought down to about 120° C. The $H_2S$ reading is noted by attaching a gas detector tube in the outlet valve. The $H_2S$ concentration is also measured by purging $N_2$ gas into the reactor. After about 5 min $N_2$ purging in the autoclave is carried out (approximately at a rate about 100 to about 110 ml/min) via inlet non-return valve. The purging is continued for about 4 hrs and $H_2S$ is measured from outlet by using $H_2S$ detector tube. Any increase in $H_2S$ concentration with time is recorded. Upon no increase in $H_2S$ concentration over time, the experiment can be stopped.

TABLE I

| Composition | Dosage (in ppm, as such) | Dosage (in ppm, active) | $H_2S$ w/o purge (5 min) | $H_2S$ (in ppm, final) |
|---|---|---|---|---|
| Blank | — | — | 800 | 20000 |
| Copper Glycinate (Cu-29%), 100% active [additive 1] | 125 | 125 (Cu 36 ppm) | <10 | 7000 |
| Copper Glycinate [additive 1] + PO-TIPA* (activator) | 125 (additive 1, (Cu 36 ppm)) + 7 (activator) | 125 (additive 1, (Cu 36 ppm)) + 7 (activator) | <10 | 3800 |

*The exemplary PO-TIPA sample is obtained by reacting 1 mole of TIPA with 25 moles of propylene oxide (PO), and may be referred to as TI25P.

It may be noted that the present additive compositions may also comprise additional additives, for example, the corrosion inhibiting additives.

The present invention is now described with the help of following examples, which are not intended to limit scope of the present invention, but have been incorporated for the sake of illustrating the advantages and best mode of the present invention over the prior art.

EXAMPLES

In order to demonstrate surprising and unexpected technical effects and advantages, and synergistic effect of the present invention, the inventor has conducted following experiments.

$H_2S$ Scavenging of Compositions with Addition of PPA:

This experiment was conducted at about 175° C. for about 1 hr. in BORL Light Basra sample. The solid VR sample is melted at about 150° C. before testing. About 300 gm of sample is taken in 600 ml capacity autoclave reactor and about 0.45% of PPA (about 1.35 gm) is added in it. The autoclave is sealed, stirred at about 200 RPM and heated to about 120° C. for about 20 min for uniform mixing of the PPA with the asphalt. The composition (of Table-I) is added The synergistic effect of the present composition may be seen in above experimental results as on addition of just about 7 ppm PO-TIPA in about 125 ppm of Cu Glycinate, the $H_2S$ scavenging has reduced by about more than about 45%".

$H_2S$ Scavenging of Compositions without Addition of PPA:

This experiment was conducted at about 175° C. for about 1 hr. in BORL Light Basra sample. The solid VR sample is melted at about 150° C. before testing. About 300 gm of sample is taken in 600 ml capacity autoclave reactor and about 0.45% of PPA (about 1.35 gm) is added in it. The autoclave is sealed, stirred at about 200 RPM and heated to about 120° C. for about 20 min for uniform mixing of the PPA with the asphalt. The composition (of Table-II) is added into the sample after about 20 min of heating. Autoclave reactor is sealed properly and maintained at temperature of about 177° C. for about 1 hr. To check the $H_2S$ concentration, the temperature of the autoclave is brought down to about 120° C. The $H_2S$ reading is noted by attaching a gas detector tube in the outlet valve. The $H_2S$ concentration is also measured by purging $N_2$ gas into the reactor. After about 5 min $N_2$ purging in the autoclave is carried out (approximately at a rate about 100 to about 110 ml/min) via inlet non-return valve. The purging is continued for about 4 hrs and $H_2S$ is measured from outlet by using $H_2S$ detector tube. Any increase in $H_2S$ concentration with time is recorded. Upon no increase in $H_2S$ concentration over time, the experiment can be stopped.

TABLE II

| Composition | Dosage (in ppm, as such) | H2S w/o purge (5 min) | $H_2S$ (in ppm, final) | H2S Scavenging Efficiency (in %) |
|---|---|---|---|---|
| Blank | — | 300 | 8000 | — |
| Copper Octoate, Cu- | 250 | <10 | 3000 | 62.5 |

TABLE II-continued

| Composition | Dosage (in ppm, as such) | H2S w/o purge (5 min) | $H_2S$ (in ppm, final) | H2S Scavenging Efficiency (in %) |
|---|---|---|---|---|
| 10% (Active-88%) [additive 1] | 500 | <10 | 800 | 90.0 |
| | 600 | <10 | 50 | 99.4 |
| Copper Octoate, Cu-10% (Active-88%) [additive 1] + TIPA (activator) | 237.5 (additive 1, (Cu 36 ppm)) + 12.5 (activator) | <10 | 800 | 90.0 |
| | 225 (additive 1, (Cu 36 ppm)) + 25 (activator) | <10 | <10 | 100 |
| | 285 (additive 1, (Cu 36 ppm)) + 15 (activator) | <10 | <10 | 100 |

The synergistic effect of the present composition may be seen in above experimental results as on addition of just about 25 ppm TIPA in about 225 ppm of Cu Octoate, the $H_2S$ scavenging efficiency has substantially increased to about 100%.

The foregoing examples confirm synergistic effects, i.e. surprising and unexpected effects of the present invention over the prior art.

The above experimental findings confirm surprising and unexpected technical effects and advantages, and synergistic property of the presently provided hydrogen sulfide scavenging additive compositions of the present invention.

The above experimental results also confirm that the presently provided composition is superior than the prior art additive compositions, and hence, has technical advantages and surprising effects over the prior art additives, and comparative additives and compositions.

The above findings also confirm that the present composition is more economical and environment friendly than the prior art compositions.

It may be noted that the present invention has been described with the help of foregoing examples, which are not intended to limit scope of the present invention, but are only illustrative.

It may be noted that the term "about" as employed herein is not intended to enlarge scope of claimed invention, but has been incorporated only to include permissible experimental errors of the field of the present invention.

The invention claimed is:

1. An amine based hydrogen sulfide ($H_2S$) scavenging additive composition comprising:
    A). an additive 1 comprising at least one compound selected from the group comprising copper compound, copper soap, and copper salts of organic acid; and
    B). at least one activator capable of enhancing hydrogen sulfide ($H_2S$) scavenging efficiency of the additive 1, wherein the activator comprises aliphatic tertiary amine, or oxyalkylated derivate of aliphatic amine, or a mixture thereof;
    wherein the copper salt of the organic acid is selected from the group comprising:
        (i) copper octoate;
        (ii) copper glycinate; or
        (iii) a mixture thereof; and
    wherein the aliphatic tertiary amine activator is selected from the group comprising:
        (a) tri-isopropanolamine (TIPA);
        (b) ethylene oxide (EO) derivative of TIPA or ethoxylated TIPA (EO-TIPA);
        (c) propylene oxide (PO) derivative of TIPA or propoxylated TIPA (PO-TIPA); and
        (d) a mixture thereof.

2. The composition as claimed in claim 1, wherein the oxyalkylated derivate of aliphatic tertiary amine comprises:
    (a) ethylene oxide (EO) derivative of aliphatic tertiary amine;
    (b) propylene oxide (PO) derivative of aliphatic tertiary amine; or
    (c) a mixture thereof.

3. The composition as claimed in claim 1, wherein the composition further comprises polyphosphoric acid (PPA).

4. The composition as claimed in claim 1, wherein the hydrocarbon may comprise hydrocarbon stream including crude oil, fuel oil, sour gas, asphalts and refined products contained in storage tanks, vessels, and pipelines.

5. The composition as claimed in claim 1, wherein the hydrogen sulfide containing compound may comprise sulfur containing compounds, including hydrogen sulphide or mercaptans, or a mixture thereof.

6. A composition for scavenging hydrogen sulfide, wherein the composition comprises:
    (a) a hydrocarbon comprising sulfur containing compounds; and
    (b) a hydrogen sulfide scavenging additive composition as claimed in claim 1.

7. A method for scavenging hydrogen sulphide in hydrocarbon comprising sulfur containing compounds, wherein the method comprises contacting the hydrocarbon with the amine based hydrogen sulfide scavenging additive composition as claimed in claim 1.

8. A method of using the amine based hydrogen sulfide scavenging additive composition for scavenging hydrogen sulphide in hydrocarbon comprising sulfur containing compounds, wherein the method comprises adding to the hydrocarbon the amine based hydrogen sulfide scavenging additive composition as claimed in claim 1.

9. The composition as claimed in claim 2, wherein the composition further comprises polyphosphoric acid (PPA).

10. The composition as claimed in claim 2, wherein the hydrocarbon may comprise hydrocarbon stream including crude oil, fuel oil, sour gas, asphalts and refined products contained in storage tanks, vessels, and pipelines.

11. The composition as claimed in claim 3, wherein the hydrocarbon may comprise hydrocarbon stream including crude oil, fuel oil, sour gas, asphalts and refined products contained in storage tanks, vessels, and pipelines.

12. A composition for scavenging hydrogen sulfide, wherein the composition comprises:

(a) a hydrocarbon comprising sulfur containing compounds; and
(b) a hydrogen sulfide scavenging additive composition as claimed in claim 2.

13. A composition for scavenging hydrogen sulfide, wherein the composition comprises:
(a) a hydrocarbon comprising sulfur containing compounds; and
(b) a hydrogen sulfide scavenging additive composition as claimed in claim 3.

14. A method for scavenging hydrogen sulphide in hydrocarbon comprising sulfur containing compounds, wherein the method comprises contacting the hydrocarbon with the amine based hydrogen sulfide scavenging additive composition as claimed in claim 2.

15. A method for scavenging hydrogen sulphide in hydrocarbon comprising sulfur containing compounds, wherein the method comprises contacting the hydrocarbon with the amine based hydrogen sulfide scavenging additive composition as claimed in claim 3.

16. A method of using the amine based hydrogen sulfide scavenging additive composition for scavenging hydrogen sulphide in hydrocarbon comprising sulfur containing compounds, wherein the method comprises adding to the hydrocarbon the amine based hydrogen sulfide scavenging additive composition as claimed in claim 2.

17. A method of using the amine based hydrogen sulfide scavenging additive composition for scavenging hydrogen sulphide in hydrocarbon comprising sulfur containing compounds, wherein the method comprises adding to the hydrocarbon the amine based hydrogen sulfide scavenging additive composition as claimed in claim 3.

* * * * *